US008251115B2

(12) United States Patent
Kolp et al.

(10) Patent No.: US 8,251,115 B2
(45) Date of Patent: Aug. 28, 2012

(54) POSTAGE LABEL DISPENSING SYSTEM HAVING A PEELER PLOW FOR DISPENSING APPLICATION READY AND/OR LINED POSTAGE LABELS

(75) Inventors: Benjamin J. Kolp, Derby, CT (US); David W. Beckstrom, Roxbury, CT (US)

(73) Assignee: Pitney Bowes Inc., Stamford, CT (US)

( * ) Notice: Subject to any disclaimer, the term of this patent is extended or adjusted under 35 U.S.C. 154(b) by 466 days.

(21) Appl. No.: 12/627,435

(22) Filed: Nov. 30, 2009

(65) Prior Publication Data

US 2011/0126725 A1 Jun. 2, 2011

(51) Int. Cl.
*B32B 41/00* (2006.01)

(52) U.S. Cl. ..................... 156/367; 156/368; 156/442.1; 156/717; 156/719; 156/762; 156/767

(58) Field of Classification Search .................. 156/247, 156/248, 249, 250, 257, 277, 289, 367, 368, 156/384, 387, 442.1, 510, 537, 540, 717, 156/719, 759, 762, 764, 765, 767, 933, 944
See application file for complete search history.

(56) References Cited

U.S. PATENT DOCUMENTS 4,366,023 A * 12/1982 Voltmer ........................ 156/542
8,167,017 B2 * 5/2012 Kolp et al. .................... 156/387
2008/0149261 A1 * 6/2008 Farmer .......................... 156/196
2011/0114262 A1 * 5/2011 Kolp et al. .................... 156/354
2011/0120655 A1 * 5/2011 Kolp et al. .................... 156/387

* cited by examiner

*Primary Examiner* — George Koch
(74) *Attorney, Agent, or Firm* — Brian A. Collins; Charles R. Malandra, Jr.; Steven J. Shapiro

(57) ABSTRACT

A postage label dispensing system for dispensing adhesive-backed labels includes a conveyance system for displacing a supply of label material along a feed path wherein the label material includes a face material having an adhesive backing and a liner material detachably bonded to the adhesive backing. The adhesive backing defines a pair of longitudinal adhesive strips and a non-adhesive region disposed therebetween. The liner material has a longitudinal cut disposed adjacent to, and aligned with, the non-adhesive region to define a pair of liner strips. A peeler plow is disposed downstream of a bending means which induces a bend in the label material along an axis substantially parallel to the longitudinal cut, i.e., in an area corresponding to the non-adhesive region, which bend produces an opening between the face material and the liner strips. The peeler plow includes a tip portion operative to penetrate the opening between the face material and the liner strips, and an arcuate blade, disposed to each side of the tip portion, operative to peel the liner strips from the adhesive backing of the face material. A processor is operative to control the conveyance system such that the tip portion of the peeler plow penetrates the opening and the liner strips are peeled from the face material to dispense an application ready printed label. Alternatively, the peeler plow may be repositioned, from a first to a second position, such that the label material is conveyed over an upper surface of the peeler plow to dispense a plurality of lined labels.

18 Claims, 8 Drawing Sheets

POSTAGE LABEL DISPENSING SYSTEM HAVING A PEELER PLOW FOR DISPENSING APPLICATION READY AND/OR LINED POSTAGE LABELS

FIELD OF THE INVENTION

The present invention relates to apparatus for producing adhesive-backed labels, and more particularly, to a system for dispensing application ready and lined adhesive-backed labels.

BACKGROUND OF THE INVENTION

Conventional apparatus for producing and dispensing adhesive-backed labels include: (i) a device for printing information/symbology on the face of a label supply, i.e., a web/spool of a label face/liner material, and (ii) a cutting apparatus for separating the label face/liner material from the web/spool i.e., to produce a single adhesive-backed/lined label. While some of the label producing apparatus provide a stack of individually-printed labels ready for an operator to remove the liner (also referred to as the "backing material"), other label fabrication systems (oftentimes including a device known as "peeler bar") automatically separate the face material from the liner to provide an application-ready label. With regard to the former, it will be appreciated that the stack of labels facilitates application thereof at a subsequent time or at a remote location, i.e., not within the immediate vicinity of the label producing apparatus. However, the operator is tasked with removing the adhesive backed label from the liner at the time of application which can be a laborious/costly operation. With respect to the former, it will be appreciated that the automated system for separating the adhesive-backed label face from the liner can be complex, and does not provide the operator with the option of applying the label at a remote location. That is, an operator must apply individual labels immediately upon label dispensation.

Mailing machines are devices which may include a label fabrication and/or dispensing system for the purpose of applying postage to mailpiece envelopes. These machines often include an option to print and dispense postage indicia/franking symbology either; (i) directly on the face of a mailpiece envelope, or (ii) on an adhesive-backed label which can, thereafter, be applied to the mailpiece envelope. With respect to the latter, the option to print a postage indicia/franking label is often selected when the surface contour of the mailpiece envelope is irregular and printing directly on the face may result in a distorted image. Examples include envelopes having irregularly shaped content material, or those including a liner or layer to protect fragile content material ("bubble-wrap" protection).

These options are accommodated by a print station having at least one print head which is moveable, along rails or guides, from one feed path to another. In one operating mode, the print head is positioned in the feed path of a sealed/completed envelope to print on the face of the envelope, and, in another operating mode, the print head is positioned directly over the feed path of a supply/spool of label face/liner material. Once printed, the label is cut, accumulated and/or dispensed in the manner described above in connection with conventional label fabrication/dispensing systems.

In addition to the various shortcomings associated with conventional label fabrication/dispensing systems, mailing machines introduce the added complexity of printing currency on the labels which are fabricated. That is, inasmuch as the label fabrication systems commonly associated with mailing machines print currency, these systems must be highly reliable to prevent the operator from incurring additional cost as a result of a torn or damaged postage indica/franking label. It will be appreciated that, once debited from the vault of the mailing machine, a damaged or improperly printed/dispensed postage label cannot be easily/immediately credited without being validated by an authorized source, e.g., a Postal Authority.

A need, therefore, exists for a label fabrication and dispensing system which (i) accommodates multiple operating modes, i.e., labels dispensed with a liner intact or removed, (ii) facilitates the separation of the label face from the liner removal, and (iii) minimizes complexity for added reliability.

SUMMARY OF THE INVENTION

A postage label dispensing system is provided for dispensing adhesive-backed labels. The system includes a conveyance system for displacing a supply of label material along a feed path wherein the label material includes a face material having an adhesive backing and a liner material detachably bonded to the adhesive backing. The adhesive backing defines a pair of longitudinal adhesive strips and a non-adhesive region disposed therebetween. The liner material has a longitudinal cut disposed adjacent to, and aligned with, the non-adhesive region to define a pair of liner strips. A peeler plow is disposed downstream of a bending means which induces a bend in the label material along an axis substantially parallel to the longitudinal cut, i.e., in an area corresponding to the non-adhesive region, which bend produces an opening between the face material and the liner strips. The peeler plow includes a tip portion operative to penetrate the opening between the face material and the liner strips, and an arcuate blade, disposed to each side of the tip portion, operative to peel the liner strips from the adhesive backing of the face material. A processor is operative to control the conveyance system such that the tip portion of the peeler plow penetrates the opening and the liner strips are peeled from the face material to dispense an application ready printed label.

Alternatively, the peeler plow may be repositioned, from a first to a second position, such that the label material is conveyed over an upper surface of the peeler plow to dispense a plurality of lined labels.

BRIEF DESCRIPTION OF THE DRAWINGS

Further details of the present invention are provided in the accompanying drawings, detailed description, and claims.

DETAILED DESCRIPTION

A system for dispensing and/or fabricating adhesive-backed labels is described herein. The invention is described in the context of a system for dispensing printed labels, a removable module for dispensing printed labels, and a system for fabricating and dispensing postage labels. The inventive teachings are also described in the context of a mailing machine for printing postage indicia/franking labels, although, it should be appreciated that any label producing and/or dispensing apparatus may be employed. A mailing machine merely provides an illustrative example of one embodiment of the invention, and should not be considered limiting when interpreting the meaning and/or scope of the appended claims.

Figure 1:
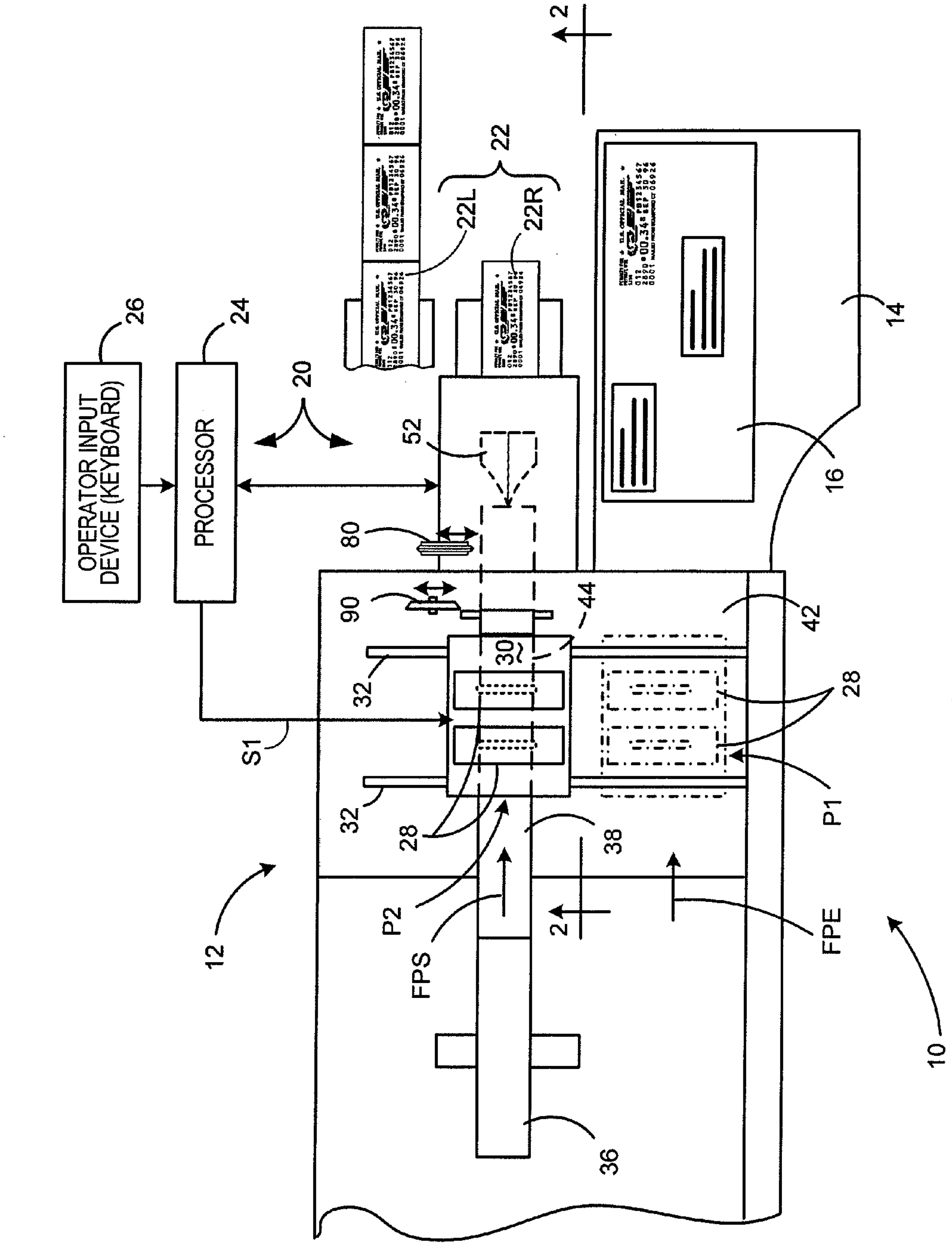
FIG. 1 is a top schematic view of a mailing machine including a positionable print head for printing along two feed paths, a first feed path for printing on the face of a mailpiece envelope, and a second feed path for printing on label material.

FIG. 1 depicts a schematic, broken-away top view of a mailing machine 10 according to the teachings of the present invention. In particular, the views illustrate a print station 12 in combination with a forward stacking tray 14 for receiving finished mailpieces 16, and a system 20 for dispensing adhesive-backed postage indicia/franking labels 22 (hereinafter referred to simply as "postage labels"). The postage labels 22 may be dispensed as application ready labels 22R, i.e., adhesive backed printed labels having the lining removed for immediate application, or as lined labels 22L, i.e., printed labels 22 with a liner to protect the adhesive backing of the printed label 22 for subsequent application.

The mailing machine 10 and label dispensing system 20 of the present invention include a processor 24 which receives operator input through a conventional input device 26, e.g., a touch screen display, keyboard, etc., to control the various operations of the mailing machine 10 and label dispensing system 20. With regard to the mailing machine 10, these inputs may include information regarding the type of mailpieces being processed, their weight, (if the machine is not equipped with a scale, or weigh-on-the-way system), print resolution, vault information, encryption/security inputs, network information, etc. In addition to these inputs, the mailing machine 10 of the present invention includes an option to print postage indicia and/or franking symbology either: (i) on the face of the mailpiece envelope 16, or (ii) on the face of the postage label 22. This is achieved by mounting at least one of the print heads 28 on a moveable carriage 30/rail system 32 which extends orthogonally across the feed path FPE of the processed mailpiece envelope 16 or, the feed path FPS of a web/spool 36 of label material 38. More specifically, the processor 24 is operatively coupled to an actuator (not shown) in the print station 12 to reposition at least one of the print heads 28 along one of the feed paths FPE, FPS depending upon the option selected by the operator. In a first position P1 (shown in phantom lines), the print heads 28 are disposed across the feed path of finished mailpieces and print postage indicia directly on the face of the mailpiece envelope 16. In a second position P2, (shown in solid lines), the print heads 28 are positioned across the feed path FPS of the web/spool supply 36 to print the postage indicia on the face of the label material 38.

While not shown in the schematic illustrations, each feed path FPE, FPS includes a transport system for conveying the finished envelope 16 or supply of label material 38. An envelop transport system may include a series of rollers along an envelope transport deck 42 of the mailing machine 10 for conveying the finished mailpiece through the print station 12 to the stacking tray 14. Similarly, a label material transport system may include rollers (not shown) to pay-out the label material 38 along a label transport deck 44 through the print station 12 to the label dispensing system 20.

Before discussing the operation of the label dispensing system 20, it will be useful to provide a brief description of the various components and their arrangement within the mailing machine 10. In the described embodiment and referring to FIGS. 1 and 2, the print heads 28 of the mailing machine 10 print postage indicia on the label material 38 which includes an adhesive-backed face material 46 and a liner material 48 to protect and carry the adhesive-backed face material 46. It will be appreciated that the face material 46 is processed by the mailing machine 10 and label dispensing system 20 (i.e., printed, cut and dispensed) to produce the postage labels 22, i.e., either an application ready label 22R or a lined-label 22L. Once printed, the label material 38 is paid-out though an exit orifice EX of the mailing machine 10 and received by the label dispensing system 20.

Figures 2, 2A:
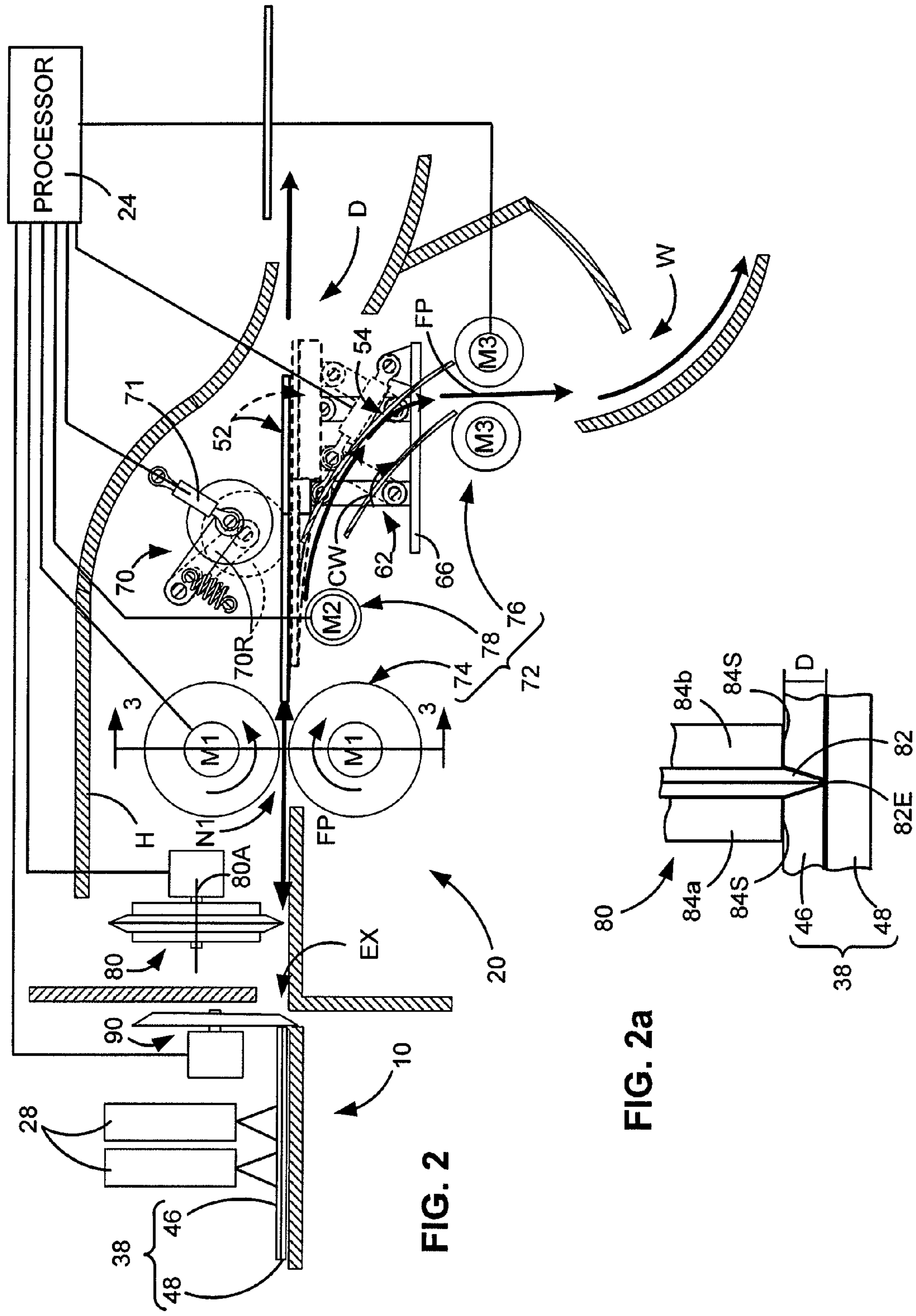
FIG. 2 is a side schematic view of the mailing machine from a perspective along line 2-2 of FIG. 1 depicting the relevant details of a label dispensing system including a system for displacing the label material along the feed path, and a peeler plow operative to strip and dispense labels from an outlet of a housing.
FIG. 2*a* is an enlarged, broken away front view of a cutting apparatus operative to produce a cut of a prescribed depth through the label material (i.e., a kiss-cut).
Figure 4:
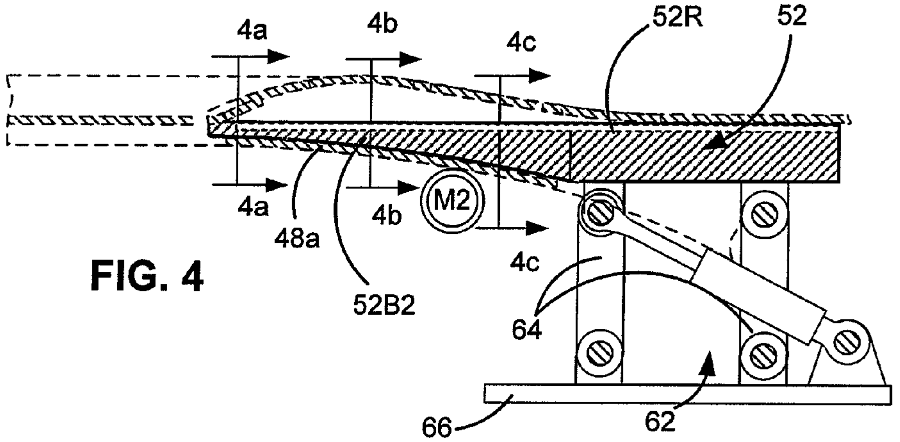
FIG. 4 is a cross sectional view taken substantially along line 4-4 of FIG. 3*a*.
Figure 3:
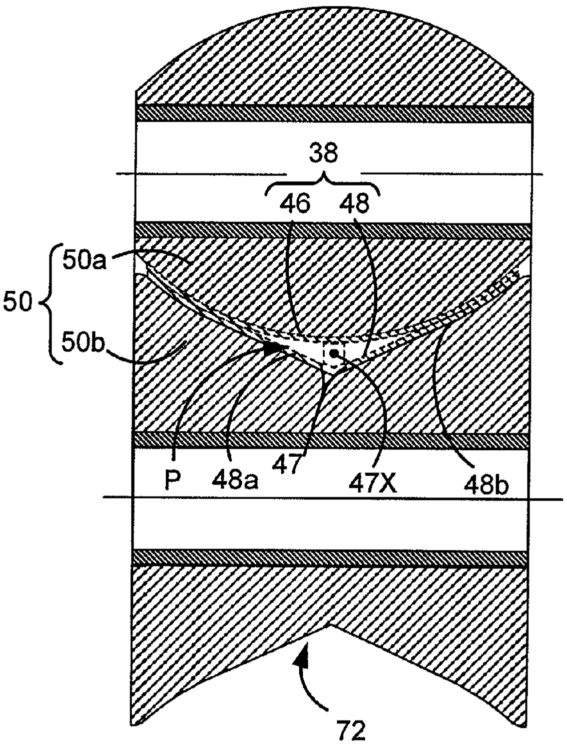
FIG. 3 is a cross sectional view taken substantially along line 3-3 of FIG. 2.
Figure 3A:
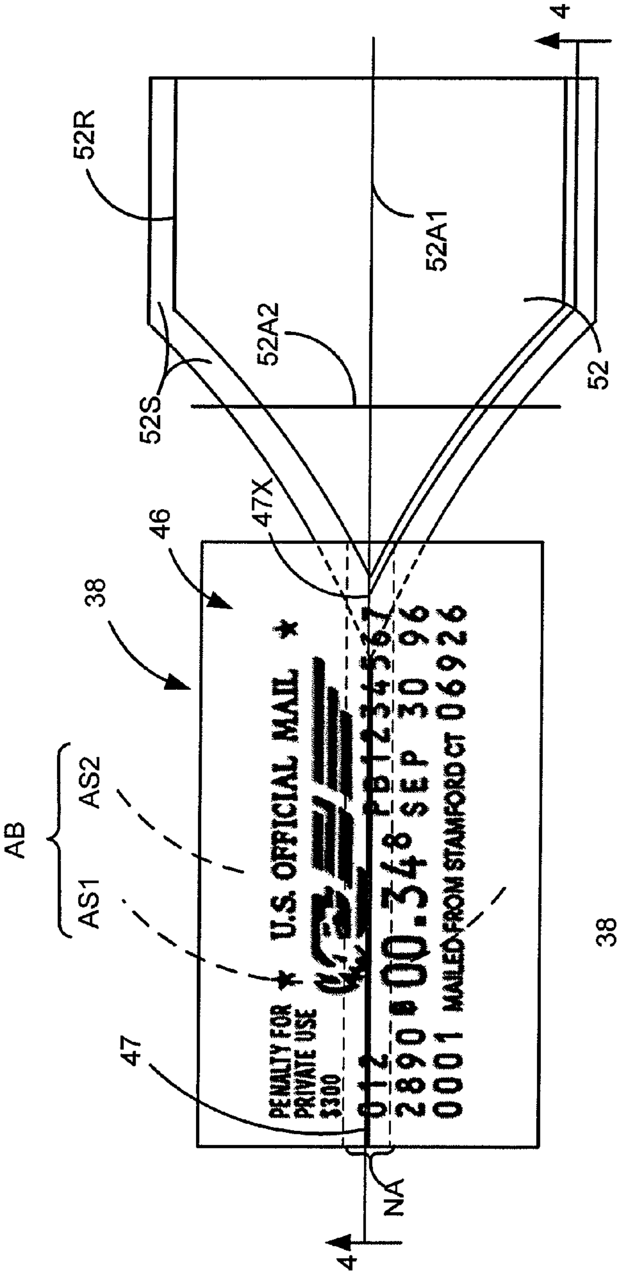
FIG. 3*a* depicts a top view of the peeler plow receiving label material having a printed postage indicia thereon.
Figure 3B:
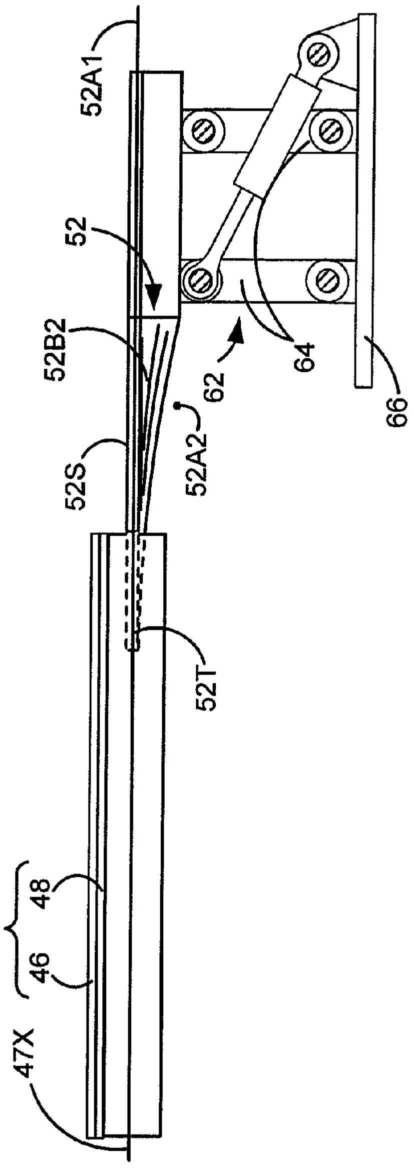
FIG. 3*b* is a side view of the peeler plow and label material shown in FIG. 3*a*.

In FIGS. 2 through 3*b*, the face material 46 includes an adhesive backing AB defining a pair of adhesive strips AS1, AS2 and a non-adhesive region NA disposed therebetween. The liner material 48 includes a longitudinal cut 47 disposed adjacent to, and aligned with, the each non-adhesive region NA. Generally, the longitudinal cut 47 bisects the region defined by the non-adhesive region NA into equal portions, although the cut 47 may be biased toward one or the other of the adhesive strips AS1, AS2 of the adhesive backing AB. As a result, the longitudinal cut 47 bifurcates the liner material 48 into a pair of liner strips 48*a*, 48*b* which are secured to the face material 46 along the adhesive strips AS1, AS2 of the adhesive backing AB. The spatial relationship between the non-adhesive region NA, the adhesive strips AS1, AS2, and the longitudinal cut 47 will be discussed in greater detail below when describing the operation of the label dispensing system 20 and the dispensation of an application ready label 22R.

The label dispensing system 20 includes a detachable housing H having a dispensing and waste outlet, D and W, respectively, for dispensing (i) application-ready labels 22R (FIG. 1), i.e., printed labels having the liner material 48 removed for immediate application, (ii) waste material (not shown in FIGS. 1 and 2), i.e., liner material 48 and/or face material 46 which is produced following dispensation of the application-ready labels 22R, and (iii) lined labels 22L (see FIG. 1), i.e., adhesive-backed printed labels including the liner material 38 to protect the adhesive backing or printed labels 22 along the internal feed path of the label dispensing system 20. The dispensing outlet D is disposed through an end portion of the housing H and is dedicated to dispensing ready-to-use/application-ready printed labels 22R i.e., adhesive-backed labels without liner material 48, and a stack, stream or length of lined labels 22 which can be removed for application at a subsequent time or at a remote location. The waste outlet W is disposed through a lower portion of the housing H, and is operative to remove waste material after dispensing the application ready label 22R from the dispensing outlet D.

In FIGS. 2 through 4*c*, the label dispensing system 20 includes (i) a means 50 (best seen in FIG. 3) for inducing a bend in the label material 38 about an axis 47×substantially parallel, and proximal, to the longitudinal cut 47 in the liner material 48 (see FIG. 2), (ii) a repositionable peeler plow 52, and (iii) a conveyance system 72 for displacing the label material 38 along a feed path FP. In FIG. 3, the 50 for inducing a bend in the label material 38 includes any combination of rollers 50*a*, 50*b*, back-to-back belts (not shown), or guide members (also not shown) which cause the edges of the liner material 48, i.e., adjacent the cut 47, to separate from the adhesive-backed face material 46. That is, inasmuch as the edges of the liner material 48 are not secured to the face material in the region corresponding to the non-adhesive strip NA, the bending stiffness properties of the liner material 48 cause the edges to remain linear while the face material 46 bends about the axis 47X. As a result, an opening P is produced between each edge of the liner material 48 and the face material 46. In the described embodiment, the bending means 50 includes a pair of rollers 50*a*, 50*b* defining a V-shaped nip N1 along a cross-section substantially orthogonal to the feed path FP of the label material 38. The V-shaped nip N1 provides sufficient clearance or spacing for the liner material 48 to produce the opening P. The rollers 50*a*, 50*b* may be integrated with the conveyance system 72, i.e., producing drive rollers 74 for conveying the label material 38 along the feed path FP, or may be entirely independent of the conveyance system 72. To avoid smearing of any printed information of the face material 46, it may be desirable to include relief regions in the upper roller 50*a*, or to convey the label material 38 via contact along its outmost edges.

Figure 4A:
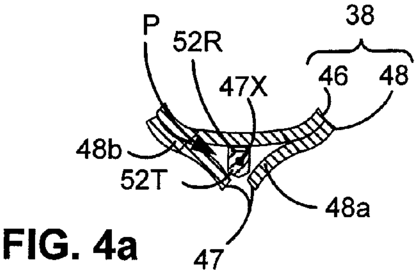
FIG. 4*a* is a cross sectional view taken substantially along line 4*a*-4*a* of FIG. 4.
Figure 4B:
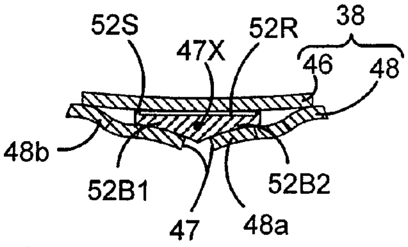
FIG. 4*b* is a cross sectional view taken substantially along line 4*b*-4*b* of FIG. 4.

In FIGS. 2, 3*a* and 3*b*, the peeler plow 52 is disposed downstream of the bending means 50 and includes a tip portion 52T operative to penetrate the opening P defined between the face and liner materials 46, 48, and first and second arcuate blades 52B1, 52B2 operative to separate the liner material 48*a*, 48*b*, disposed to each side of the longitudinal cut 47, from the adhesive-backed face material 46. The means 50 is disposed upstream of the or upper and lower rollers In FIG. 4*a*, the tip portion 52T of the peeler plow 52 interposes the opening P between the face and liner strips 46, 48*a*, 48*b*. This begins the process of separating the liner strips 48*a*, 48*b*, to each side of the longitudinal cut 47, from the face material 46. In FIGS. 2 and 4*b*, the arcuate blades 52B1, 52B2 displace, separate and split the strips 48*a*, 48*b* of the liner material 48 from the face material 46. The upper surface 52U of the peeler plow 52 may have an arcuate contour to effect a slight bend in the face material 46, e.g., a convex curvature about the longitudinal axis 52A1 of the peeler plow 52, to stiffen the printed label 22 upon dispensation. Furthermore, the upper surface 52U may include one or more a recesses 52R to minimize the surface area that the adhesive backing AB may contact upon separation from the liner material 48, i.e., when an operator pulls an application-ready label from the label dispensing system 20. Once separated, the strips 48*a*, 48*b* are guided into chutes 54 disposed to each side of the peeler plow 52 (see FIG. 2) to facilitate disposal of the liner material 48 through the waste outlet W (discussed in greater detail hereinafter) of the housing H.

Figure 4C:
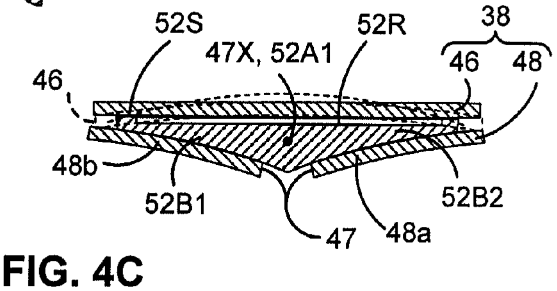
FIG. 4*c* is a cross sectional view taken substantially along line 4*c*-4*c* of FIG. 4.

In FIGS. 3*a* and 4*c*, the arcuate blades 52B1, 52B2 transition outboard from the longitudinal axis 52A1, substantially parallel to the axis 47X of the longitudinal cut 47, such that the strips 48*a*, 48*b* are displaced to each side of the peeler plow 52, i.e., away from the axis 47X. That is, each of the arcuate blades 52B1, 52B2 define a contoured surface which increases in width dimension, i.e., from the tip portion 52T to the downstream end 52E of the peeler plow 52. As such, the liner strips 48*a*, 48*b* are gradually separated from the adhesive backing AB of the face material 46. Additionally, the contoured surface of the arcuate blades 52B1, 52B2 bends downwardly, about a transverse axis 52A2, orthogonal to the longitudinal axis 52A1, away from the upper surface 52U of the peeler plow 52. As such, the liner strips 48*a*, 48*b* are directed downwardly toward the waste outlet W of the housing H. Once the liner strips 48*a*, 48*b* have been conveyed past the blades 52B1, 52B2, the liner strips 48*a*, 48*b* are completely separated from the face material 46

The peeler plow 52 is pivotally mounted within the housing H by a displacement mechanism 62 which repositions or reconfigures the peeler plow 52 such that the tip portion 52T of the peeler plow 52 receives the label material 38, i.e., interposes the opening P between the face material 46 and the liner strips 48*a*, 48*b*, in a first operating mode, and slides over or across the upper guide surface 52S (see FIGS. 3*a*, 3*b*, 4*b* and 4*c*) of the peeler plow 52, in a second operating mode. In the described embodiment, the peeler plow 52 is pivotally mounted to the housing H by a four bar linkage arrangement which effects rotational and vertical translation of the peeler plow 52 relative to the feed path FP of the label material 38. More specifically, one or more pairs of links 64 are pivotally mounted to the underside of the peeler plow 52 at one end thereof and to a stationary platform 66 of structure of the housing H at the other end. Furthermore, a linear actuator 68, controlled by the processor 24, is pivotally mounted to one of the links 64 at one end thereof and to the stationary platform 66 at the other end, to reposition the peeler plow 52 from the first to the second positions depending upon the selected operating mode. In the second operating mode, i.e., when the label material 38 passes over the upper surface 52S of the peeler plow 52, a spring biased roller assembly 70 may be employed to capture/secure the label material 38 as it slides over the peeler plow. This roller assembly 70 may be positioned by an actuator 71 and controlled by the processor 24, to raise or lower the roller 70R into or out of engagement with lined label material 22L. This aspect of the invention will be discussed, in greater detail, when describing the operation of the label dispensing system 20.

The conveyance system 72 includes a first and third pair of rollers, 74 and 76, respectively, disposed on the input and output sides of the peeler plow 52 to displace the label material 38. In the illustrated embodiment, the first pair of rollers 74 are vertically oriented, i.e., rotate about axes which lie in a vertical plane, and define a first drive nip N1 which displaces the label material 38 along a substantially horizontal feed path FP. The third pair of rollers 76 are horizontally oriented, i.e., rotate about axes which lie in a horizontal plane, and define a third drive nip N3 which displaces the label material 38 along a substantially vertical feed path FP. While the first and third drive nips N1, N3 are substantially orthogonal to change the direction of the feed path from horizontal to vertical, it should be appreciated that other orientations are contemplated depending upon the location of the dispensing and waste outlets D, W. In the described embodiment, the first pair of rollers 74 dually function to convey the label material 38 along the feed path FP while also inducing a bend in the label material 48 to separate the liner strips 48*a*, 48*b* from the face material 46, i.e., producing the opening P. This configuration is preferred to reduce the length of the feed path and size of the label dispensing system, however, as mentioned previously, other arrangements are contemplated. To facilitate conveyance of the label material 38 and separation of the liner strips 48*a*, 48*b* from the face material 46, a second pair of drive rollers 78 defining a second nip N2 may be employed in opposing relation to the arcuate blades 52B1, 52B2 of the peeler plow 52. More specifically, the second pair of rollers 78 may be employed to pull the label material 38 along the feed path and into the chutes 54 on each side of the peeler plow 52

Each of the rollers 74, 76, 78 may be driven by respective rotary drive motors M1, M2, M3 which are controlled by the processor 24. The processor 24 can drive each of the motors M1, M2, M3 and the respective rollers 74, 76, 78 in either direction, i.e., to bi-directionally displace the label material 38 along the feed path FP, at the same speed, or at variable speeds relative to each other. In this way, the label material 38 may be paid-out or drawn back at different rates of speed to increase or decrease the length of label material 38 between each of the drive nips N1, N2, N3 or between the rollers 78 and each of the opposing one of the arcuate blades 52B1, 52B2.

While the supply of label material 38 may include precut label material, i.e., regularly spaced kiss-cuts penetrating through the face material 46, the label fabrication system 20 may include a first cutting apparatus 80 for the purpose of cutting the face material 46 to any length. That is, since the label transport rollers and drive rollers 74, 76, 78 control the amount of label material 38 which is paid-out from the label supply 36, each postage label 22 may be cut to any size, e.g., from two (2) inches to eight (8) inches, depending upon the information to be printed. For example, some labels 22 may contain only the postage indicia IN while others may include barcode security or other symbology. In the described embodiment and referring to FIG. 2*a*, the cutting apparatus 80 includes a disc-shaped cutter 82 having circular cutting edge 82E and a rotational axis 80A parallel to the feed path FP of the label material 38. The disc-shaped cutter 82 includes one or more bearings 84*a*, 84*b* each defining a bearing surface 84S disposed radially inboard of the cutting edge 82E. The radial distance D from the cutting edge 82E to the bearing surface 84S controls the depth of the kiss-cut into the label material 38, i.e., through the face material 46. In the described embodiment, the bearing surfaces 84S are disposed on each side of the cutter 82 to more precisely control the depth of the kiss-cut.

In addition to the first cutting apparatus 80, a second cutting apparatus 90 may be disposed upstream thereof, to sever the label material 38, i.e., cut through the liner material 48 or through the combined face and liner materials 46, 48. This cutting apparatus 90 may be disposed in either the mailing machine 10, or in the label dispensing system 20, and may be controlled by the same processor 24 employed to control the position of the peeler plow 52, the conveyance system 72, and the first cutting apparatus 80. As will be described in greater detail when discussing the operation of the mailing machine 10 and label dispensing system 20, the second cutting apparatus 90 is principally employed to cut each application ready label and/or discard waste material following the dispensation of an application ready label 22R.

Figure 5:
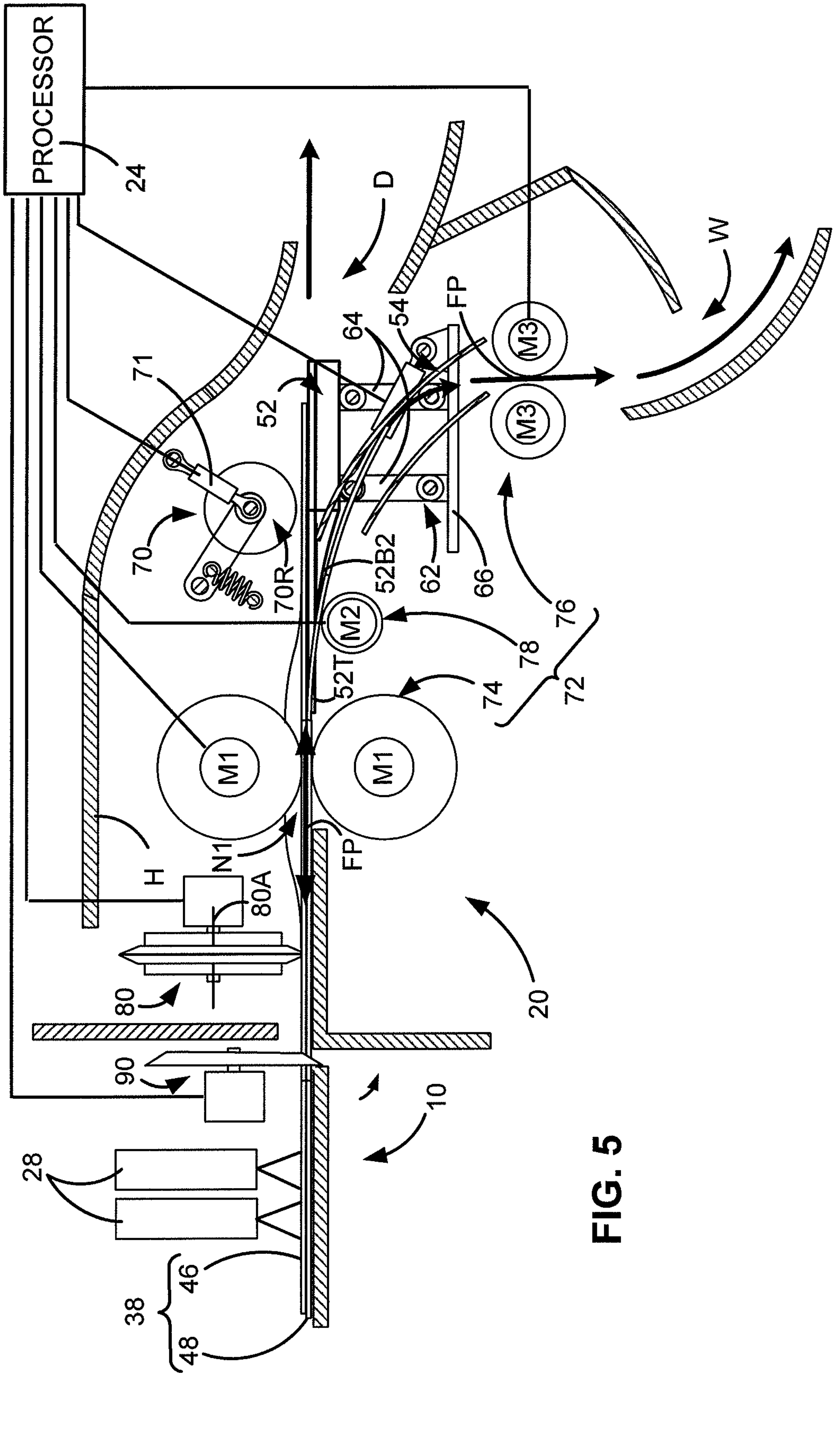
FIG. 5 depicts the label dispensing system in the first operating mode wherein a bend is induced in the label material along a central longitudinal cut to produce opening between the printed label and the liner material, and a tip portion of the peeler plow label material interposes the opening to strip the label from the liner material.
Figure 6:
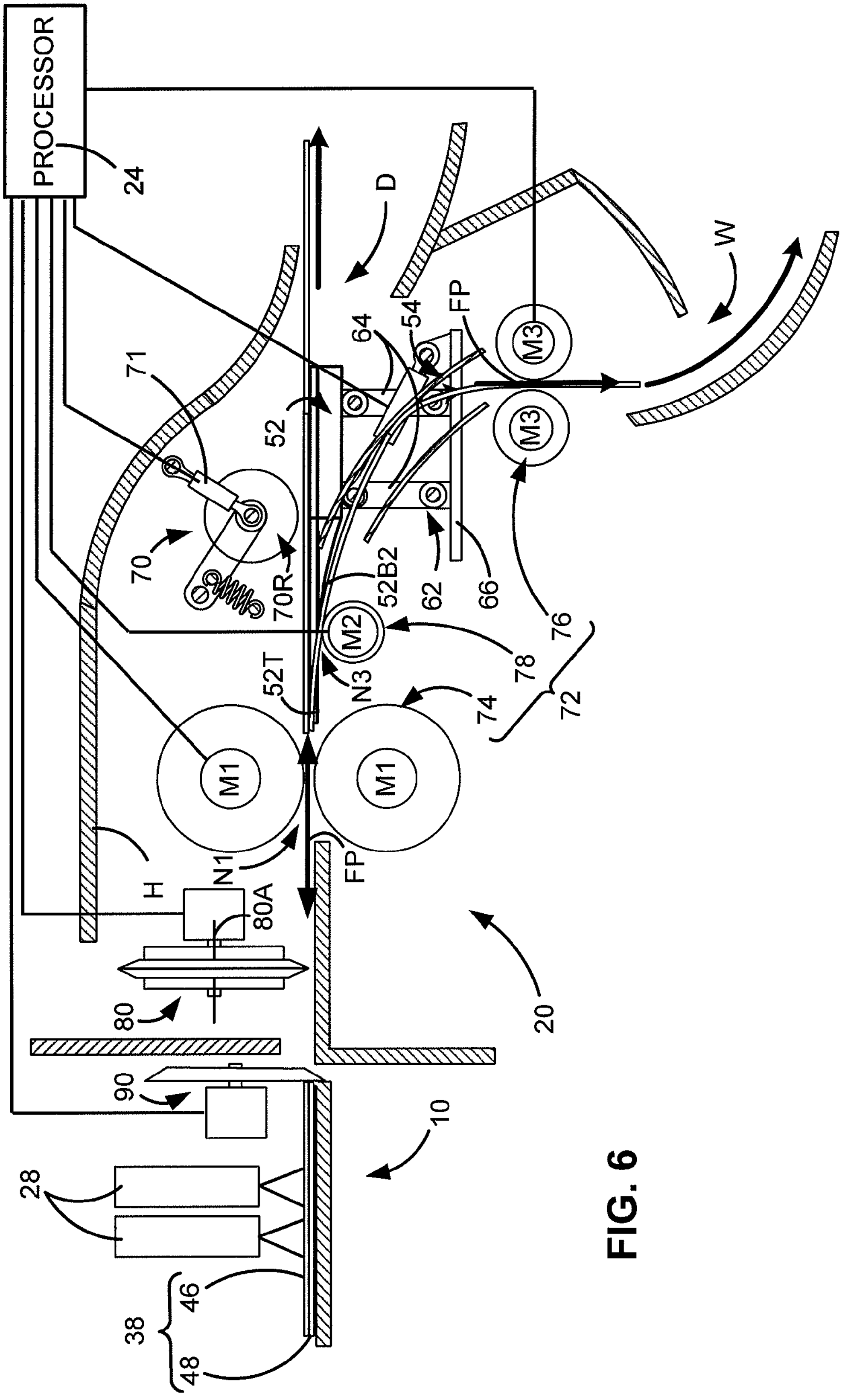
FIG. 6 depicts the label dispensing system in the first operating mode wherein an application-ready printed label is removed from the liner material and dispensed through a dispensing outlet of the housing while the liner material is directed downwardly through a waste outlet of the housing.
Figure 7:
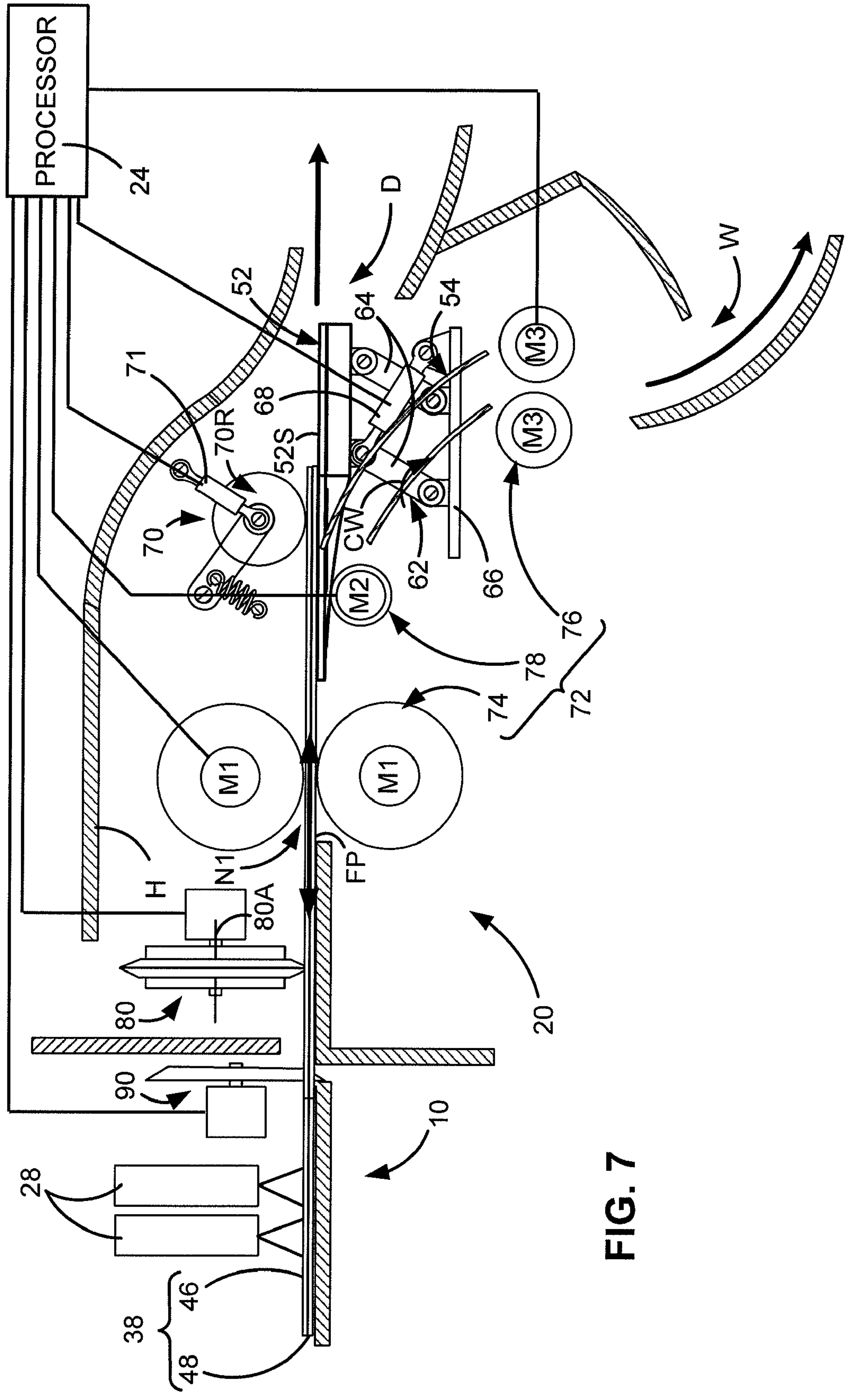
FIG. 7 depicts the label dispensing system in a second operating mode wherein the peeler plow is repositioned from a first position to a second position while a first cutting apparatus makes several kiss-cuts in the label material to produce a stream or plurality of lined labels.
Figure 8:
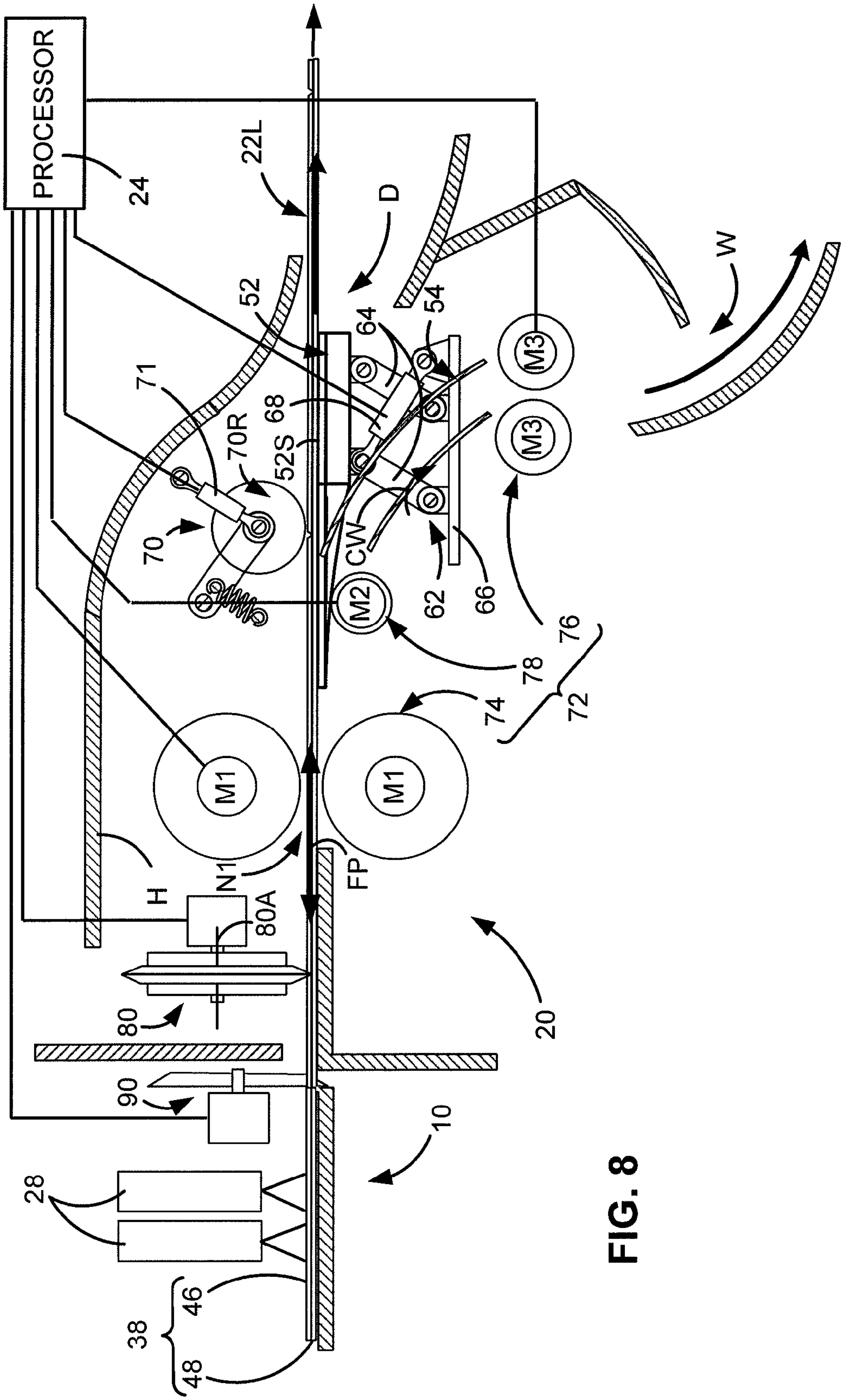
FIG. 8 depicts the label dispensing system in the second operating mode wherein the label material is guided and supported along an upper surface of the peeler plow for dispensing the lined labels through a dispensing outlet in the housing.

FIGS. 5 through 8 depict the operation of the label dispensing system 20 at various instants in time within one of at least two operating modes. These operating modes include: (i) a first operating mode associated with dispensing an application ready label 22R (FIGS. 5 and 6), and (iii) a second operating mode associated with dispensing lined labels 22R as a stream/length or stack of individual labels (FIGS. 7 and 8). In FIG. 5, the label material 38 having a postage indicia printed thereon is paid-out through the exit EX of the mailing machine 10 along the feed path FP and through the first nip N1 of the drive rollers 74. More specifically, the peeler plow 52 is in its initial, or first position. In the frame shown in FIG. 5, the nips N1, N2, N3 are paused (not driving) as the second cutting apparatus 90 cuts a printed label 22 to the desired length i.e., immediately past or upstream of the printed postage indicia.

In FIG. 6, the arcuate blades 52B1, 52B2 direct each of the liner material strips 48*a*, 48*b* through the nips N2 of rollers 78, which, in turn, drive the strips 48*a*, 48*b* through the chutes 54 and downwardly through the chutes 54 to the waste outlet W. Once the strips 48*a*, 48*b* of the liner material 48 are disposed through the nips N2 of the second pair of rollers 78, the face material 46 and printed label 22 are pulled across the peeler plow 52, i.e., by pulling the liner material 48 through each of the nips N2, to dispense an application ready label 22R through the dispensing outlet D of the housing H. Furthermore, the arcuate blades 52B1, 52B2 direct the strips 48*a*, 48*b* of t liner material 48 downwardly through the third nips N3 of the second pair of drive rollers 76. The label material 38, therefore, is displaced until a portion of an application ready label 22R extends through, and is dispensed from, the dispensing outlet D.

In an alternate embodiment of the invention, the third pair of rollers 76 may be deleted to save weight and additional cost. That is, the waste material 38W may be gravity fed through the waste outlet W without passing the liner material strips 48*a*, 48*b* through the third pair of rollers 76, i.e., the third nips N3. Hence, the chutes 54 ay be sufficient to guide the liner material 48 through the waste outlet W.

In FIGS. 7 and 8, the second operating mode of the label dispensing system 20 is depicted wherein a length or stack of printed labels 22L is produced and dispensed through the dispensing outlet D. More specifically, in FIG. 7, the peeler plow 52 has been repositioned, i.e., is repositioned in a clockwise direction CW, from the first position to the second position. The processor 24 issues a signal to the linear actuator 68 to rotate and translate the peeler plow 52 down and away from the first pair of rollers 74, i.e., a motion produced by the four-bar linkage arrangement 62 discussed earlier in the detailed description. The label material 38 is paid-out through the first pair of rollers 74 such that the liner material 48 thereof rides along, and is supported by, the upper surface 52S of the peeler plow 52. To maintain positive control of the label material 38 as it slides over the upper surface 52S, the roller assembly 70 is biased downwardly to urge the label material 38 against the upper surface 52S of the peeler plow 52.

In FIG. 8, the label material 38 is paid-out and paused such that the first cutting apparatus 80 may produce a kiss-cut KC through the face material 46 immediately upstream of the postage indicia and/or image printed on the face of the label material 38. While the label material 38 is being paid-out, a subsequent label 22 may be printed at the print station 12. Alternatively, the label material 38 may be retracted/reeled-in before producing a kiss-cut, and advanced/paid-out during print operations to maximize utilization of the label material 38, i.e., to minimize gaps of empty space or non-printing area between consecutive labels 22.

Notwithstanding the synchronization of the printing and dispensing operations, in FIG. 8, the label material 38 is paid-out, kiss-cut between each printed label 22L, and dispensed through the dispensing outlet D. Once the number of lined labels 22L have been printed, the second cutting apparatus 90 severs the label material 38 to separate the stream of lined labels 22L from the supply 36. Alternatively, individual lined labels 22L may be produced and dispensed through the outlet D by severing each lined label 22L from the upstream supply 36 and conveying each through the first pair of rollers 74 while being guided and supported along the upper or outer surface 52S of the peeler plow 52. In another embodiment of the invention, the stream of individual lined-labels 22L may include one or more tabs (not shown) upstream of a kiss cut, or between consecutive kiss-cuts, to facilitate removal of the liner material 48. That is, the first cutting apparatus 80 may produce consecutive kiss-cuts, or a kiss-cut followed by a thru-cut made by the second cutting apparatus 90, such that a small gripper tab of face material 46 remains therebetween. The gripper tab facilitates separation of the printed label from the liner material as the operator uses the tab to bend the lined-label about the kiss cut.

In summary, the system for dispensing labels 22 operates in at least two operating modes to dispense (i) printed labels 22R in a condition ready for application, (ii) waste material 38W, and (iii) lined labels 22L which may be used at any time or at any location produced. A first mode of operation dispenses application ready labels 22R through the dispensing outlet D in an optimum orientation for immediate application. In another operating mode, waste material 38W is discarded through a bottom/lower waste outlet W and uses gravity to augment collection and removal of waste material 38W, i.e., into a waste receptacle. And, in a second operating mode lined labels 22L are dispensed as a stream of tandemly arranged printed labels 22L or stacked for use at a subsequent time or at a remote location.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is

1. A postage label dispensing system for dispensing adhesive-backed labels, comprising:

a system for displacing a supply of label material along a feed path, the label material including a face material having an adhesive backing and a liner material detachably bonded to the adhesive backing, the adhesive backing defining a pair of longitudinal adhesive strips and a non-adhesive region disposed therebetween, the liner material having a longitudinal cut disposed adjacent to, and aligned with, the non-adhesive region to define a pair of liner strips having longitudinal edges substantially parallel to the feed path of the label material;

a means for inducing a bend along an axis substantially parallel to the longitudinal cut and in an area corresponding to the non-adhesive region, the bend causing the longitudinal edges of each liner strip to separate from the face material thereby producing an opening between the face material and the liner strips;

a peeler plow disposed along the feed path and downstream of the bending means, the peeler plow having tip portion and an arcuate blade disposed to each side of the tip portion, the tip portion operative to penetrate the opening between the face material and the liner strips, and the arcuate blades operative to peel the liner strips from the adhesive backing of the face material; and a processor, operative to control the conveyance system such that the tip portion of the peeler plow penetrates the opening between the face material and liner strips and the liner strips are peeled from the face material to dispense an application ready printed label.

2. The postage label dispensing system according to claim 1 wherein the arcuate blades have a contoured surface which increases in width dimension from the tip portion to a downstream end portion of the peeler plow to separate each liner strip from the adhesive backing.

3. The postage label dispensing system according to claim 1 wherein the arcuate blades have a contoured surface which bends downwardly away from an upper surface of the peeler plow to direct the liner strips through a waste outlet of the label dispensing system.

4. The postage label dispensing system according to claim 1 wherein peeler plow defines an arcuate upper surface to effect a stiffening bend in the application ready label.

5. The postage label dispensing system according to claim 4 wherein the arcuate upper surface includes a recess to minimize the surface area in contact with adhesive backing of the application ready label.

6. The postage label dispensing system according to claim 1 further comprising a displacement mechanism for repositioning the peeler plow from a first position to a second position, wherein the processor is operative to control the displacement mechanism and the position of the peeler plow such that, in the first position, the label material engages the peeler plow to remove the liner strips from the face material and dispense an application ready label, and, in the second position, label material is conveyed over an upper surface of the peeler plow to dispense a plurality of lined-labels.

7. The postage label dispensing system according to claim 6 wherein the displacement mechanism includes a four-bar linkage mounting to and underside of the peeler plow for raising and lowering the peeler plow into and out of the first and second positions.

8. The postage label dispensing system according to claim 6 wherein the face material includes a transverse cut across the width of the label material, wherein the transverse cut is produced by a first cutting apparatus operative to produce a kiss-cut through the face material of the label material and wherein the processor is operative to control the displacement of the label material relative to the first cutting apparatus to vary the length dimension of each lined label.

9. The postage label dispensing system according to claim 6 wherein the supply of label material includes a plurality of transverse cuts through the width of the label material at predetermined intervals along the length of the material supply.

10. A mailing machine, comprising:

a print station adapted to print postage indicia on a face surface of one of a mailpiece envelope and an adhesively-backed label having an adhesive-backed face material and a lining material covering the adhesive backing of the face material, the print station having a print head adapted to move from a first position to a second position wherein, in the first position, the print head is disposed along the feed path of a processed mailpiece, and, in the second position, the print head is disposed along the feed path of the label material;

a mailpiece transport system operative to convey a sealed mailpiece across the print head of the print station to receive the postage indicia, a postage label dispensing system including:

a supply of label material including a face material having an adhesive backing and a liner material detachably bonded to the adhesive backing, the adhesive backing defining a pair of longitudinal adhesive strips and a non-adhesive region disposed therebetween, the liner material having a longitudinal cut disposed adjacent to, and aligned with, the non-adhesive region to define a pair of liner strips having longitudinal edges substantially parallel to the feed path of the label material;

a label transport system for conveying the supply of label material across the print head of the print station to receive the postage indicia and operative to convey the label material along the feed path;

a means for inducing a bend along an axis substantially parallel to the longitudinal cut and in an area corresponding to the non-adhesive region, the bend causing the longitudinal edges of each liner strip to separate from the face material thereby producing an opening between the face material and the liner strips;

a peeler plow disposed along the feed path and downstream of the bending means, the peeler plow having tip portion and an arcuate blade disposed to each side of the tip portion, the tip portion operative to penetrate the opening between the face material and the liner strips, and the arcuate blades operative to peel the liner strips from the adhesive backing of the face material; and a cutting apparatus adapted to produce a transverse cut across the width dimension of the label material, the transverse cut defining a length of a printed label, a processor, operative to control the conveyance system such that the tip portion of the peeler plow penetrates the opening between the face material and liner strips and the liner strips are peeled from the face material to dispense an application ready printed label.

11. The mailing machine according to claim 10 wherein the arcuate blades have a contoured surface which increases in width dimension from the tip portion to a downstream end portion of the peeler plow to separate each liner strip from the adhesive backing.

12. The mailing machine according to claim 10 wherein the arcuate blades have a contoured surface which bends downwardly away from an upper surface of the peeler plow to direct the liner strips through a waste outlet of the label dispensing system.

13. The mailing machine according to claim 10 wherein peeler plow defines an arcuate upper surface to effect a stiffening bend in the application ready label.

14. The mailing machine according to claim 13 wherein the arcuate upper surface includes a recess to minimize the surface area in contact with adhesive backing of the application ready label.

15. The mailing machine according to claim 10 further comprising a displacement mechanism for repositioning the peeler plow from a first position to a second position, wherein the processor is operative to control the displacement mechanism and the position of the peeler plow such that, in the first position, the label material engages the peeler plow to remove the liner strips from the face material and dispense an application ready label, and, in the second position, label material is conveyed over an upper surface of the peeler plow to dispense a plurality of lined-labels.

16. The mailing machine according to claim 15 wherein the displacement mechanism includes a four-bar linkage mounting to and underside of the peeler plow for raising and lowering the peeler plow into and out of the first and second positions.

17. The mailing machine according to claim 15 wherein the face material includes a transverse cut across the width of the label material, wherein the transverse cut is produced by a first cutting apparatus operative to produce a kiss-cut through the face material of the label material and wherein the processor is operative to control the displacement of the label material relative to the first cutting apparatus to vary the length dimension of each lined label.

18. The mailing machine according to claim 15 wherein the supply of label material includes a plurality of transverse cuts through the width of the label material at predetermined intervals along the length of the material supply.

* * * * *